United States Patent
Jalan et al.

(10) Patent No.: US 10,659,354 B2
(45) Date of Patent: *May 19, 2020

(54) PROCESSING DATA PACKETS USING A POLICY BASED NETWORK PATH

(71) Applicant: A10 NETWORKS, INC., San Jose, CA (US)

(72) Inventors: Rajkumar Jalan, Saratoga, CA (US); Gurudeep Kamat, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,446

(22) Filed: Jun. 4, 2018

(65) Prior Publication Data

US 2018/0287937 A1   Oct. 4, 2018

Related U.S. Application Data

(63) Continuation of application No. 14/214,142, filed on Mar. 14, 2014, now Pat. No. 9,992,107.

(Continued)

(51) Int. Cl.
*H04L 12/721* (2013.01)
*H04L 12/725* (2013.01)

(52) U.S. Cl.
CPC ............ *H04L 45/72* (2013.01); *H04L 45/306* (2013.01); *H04L 45/38* (2013.01); *H04L 45/66* (2013.01)

(58) Field of Classification Search
CPC ....... H04L 45/306; H04L 45/38; H04L 45/70; H04L 45/72
See application file for complete search history.

(56) References Cited

U.S. PATENT DOCUMENTS

| 4,403,286 A | 9/1983 | Fry et al. |
| 4,495,570 A | 1/1985 | Kitajima et al. |

(Continued)

FOREIGN PATENT DOCUMENTS

| CN | 1372662 | 10/2002 |
| CN | 1449618 | 10/2003 |

(Continued)

OTHER PUBLICATIONS

Abe, et al., "Adaptive Split Connection Schemes in Advanced Relay Nodes," IEICE Technical Report, 2010, vol. 109 (438), pp. 25-30.

(Continued)

*Primary Examiner* — Anh Vu H Ly
*Assistant Examiner* — Hector Reyes
(74) *Attorney, Agent, or Firm* — Keith Kline; The Kline Law Firm PC

(57) ABSTRACT

Provided are methods and systems for processing data packets in a data network using a policy-based network path. The method may commence with receiving the data packet associated with a service session from a client. The method may continue with determining data packet information associated with the data packet. The method may further include determining the policy-based network path for the data packet based on the data packet information and one or more packet processing criteria. The method may continue with routing, based on the determination of the policy-based network path, the data packet along the policy-based network path.

19 Claims, 5 Drawing Sheets

Related U.S. Application Data

(60) Provisional application No. 61/799,244, filed on Mar. 15, 2013.

(56) References Cited

U.S. PATENT DOCUMENTS

| | | |
|---|---|---|
| 4,577,272 A | 3/1986 | Ballew et al. |
| 4,720,850 A | 1/1988 | Oberlander et al. |
| 4,864,492 A | 9/1989 | Blakely-Fogel et al. |
| 4,882,699 A | 11/1989 | Evensen |
| 5,031,089 A | 7/1991 | Liu et al. |
| 5,218,602 A | 6/1993 | Grant et al. |
| 5,218,676 A | 6/1993 | Ben-Ayed et al. |
| 5,293,488 A | 3/1994 | Riley et al. |
| 5,341,477 A | 8/1994 | Pitkin et al. |
| 5,432,908 A | 7/1995 | Heddes et al. |
| 5,537,542 A | 7/1996 | Eilert et al. |
| 5,563,878 A | 10/1996 | Blakeley et al. |
| 5,603,029 A | 2/1997 | Aman et al. |
| 5,675,739 A | 10/1997 | Eilert et al. |
| 5,740,371 A | 4/1998 | Wallis |
| 5,751,971 A | 5/1998 | Dobbins et al. |
| 5,754,752 A | 5/1998 | Sheh et al. |
| 5,774,660 A | 6/1998 | Brendel et al. |
| 5,774,668 A | 6/1998 | Choquier et al. |
| 5,796,936 A | 8/1998 | Watabe et al. |
| 5,812,771 A | 9/1998 | Fee et al. |
| 5,828,847 A | 10/1998 | Gehr et al. |
| 5,835,724 A | 11/1998 | Smith |
| 5,867,636 A | 2/1999 | Walker |
| 5,867,661 A | 2/1999 | Bittinger et al. |
| 5,875,296 A | 2/1999 | Shi et al. |
| 5,917,997 A | 6/1999 | Bell et al. |
| 5,918,017 A | 6/1999 | Attanasio et al. |
| 5,923,854 A | 7/1999 | Bell et al. |
| 5,931,914 A | 8/1999 | Chiu |
| 5,935,207 A | 8/1999 | Logue et al. |
| 5,935,215 A | 8/1999 | Bell et al. |
| 5,941,988 A | 8/1999 | Bhagwat et al. |
| 5,944,794 A | 8/1999 | Okamoto et al. |
| 5,946,686 A | 8/1999 | Schmuck et al. |
| 5,951,650 A | 9/1999 | Bell et al. |
| 5,951,694 A | 9/1999 | Choquier et al. |
| 5,958,053 A | 9/1999 | Denker |
| 5,995,981 A | 11/1999 | Wikstrom |
| 6,003,069 A | 12/1999 | Cavill |
| 6,006,264 A | 12/1999 | Colby et al. |
| 6,006,269 A | 12/1999 | Phaal |
| 6,031,978 A | 2/2000 | Cotner et al. |
| 6,041,357 A | 3/2000 | Kunzelman et al. |
| 6,047,268 A | 4/2000 | Bartoli et al. |
| 6,076,108 A | 6/2000 | Courts et al. |
| 6,088,728 A | 7/2000 | Bellemore et al. |
| 6,098,093 A | 8/2000 | Bayeh et al. |
| 6,104,717 A | 8/2000 | Coile et al. |
| 6,119,174 A | 9/2000 | Borowsky et al. |
| 6,128,279 A | 10/2000 | O'Neil et al. |
| 6,131,163 A | 10/2000 | Wiegel |
| 6,141,759 A | 10/2000 | Braddy |
| 6,185,598 B1 | 2/2001 | Farber et al. |
| 6,219,706 B1 | 4/2001 | Fan et al. |
| 6,223,205 B1 | 4/2001 | Harchol-Balter et al. |
| 6,223,287 B1 | 4/2001 | Douglas et al. |
| 6,247,057 B1 | 6/2001 | Barrera, III |
| 6,249,820 B1 | 6/2001 | Dobbins et al. |
| 6,252,878 B1 | 6/2001 | Locklear, Jr. et al. |
| 6,259,705 B1 | 7/2001 | Takahashi et al. |
| 6,262,976 B1 | 7/2001 | McNamara |
| 6,286,039 B1 | 9/2001 | Van Horne et al. |
| 6,314,463 B1 | 11/2001 | Abbott et al. |
| 6,317,786 B1 | 11/2001 | Yamane et al. |
| 6,321,338 B1 | 11/2001 | Porras et al. |
| 6,324,177 B1 | 11/2001 | Howes et al. |
| 6,330,560 B1 | 12/2001 | Harrison et al. |
| 6,339,423 B1 | 1/2002 | Sampson et al. |
| 6,353,614 B1 | 3/2002 | Borella et al. |
| 6,363,075 B1 | 3/2002 | Huang et al. |
| 6,363,081 B1 | 3/2002 | Gase |
| 6,374,300 B2 | 4/2002 | Masters |
| 6,374,359 B1 | 4/2002 | Shrader et al. |
| 6,381,632 B1 | 4/2002 | Lowell |
| 6,393,475 B1 | 5/2002 | Leong et al. |
| 6,397,261 B1 | 5/2002 | Eldridge et al. |
| 6,430,622 B1 | 8/2002 | Aiken, Jr. et al. |
| 6,445,704 B1 | 9/2002 | Howes et al. |
| 6,446,225 B1 | 9/2002 | Robsman et al. |
| 6,459,682 B1 | 10/2002 | Ellesson et al. |
| 6,490,682 B2 | 12/2002 | Vanstone et al. |
| 6,496,866 B2 | 12/2002 | Attanasio et al. |
| 6,510,464 B1 | 1/2003 | Grantges, Jr. et al. |
| 6,515,988 B1 | 2/2003 | Eldridge et al. |
| 6,542,926 B2 | 4/2003 | Zalewski et al. |
| 6,564,215 B1 | 5/2003 | Hsiao et al. |
| 6,567,857 B1 | 5/2003 | Gupta et al. |
| 6,578,066 B1 | 6/2003 | Logan et al. |
| 6,587,866 B1 | 7/2003 | Modi et al. |
| 6,591,262 B1 | 7/2003 | MacLellan et al. |
| 6,594,268 B1 | 7/2003 | Aukia et al. |
| 6,598,167 B2 | 7/2003 | Devine et al. |
| 6,606,315 B1 | 8/2003 | Albert et al. |
| 6,609,150 B2 | 8/2003 | Lee et al. |
| 6,611,498 B1 | 8/2003 | Baker et al. |
| 6,650,641 B1 | 11/2003 | Albert et al. |
| 6,657,974 B1 | 12/2003 | Britton et al. |
| 6,697,354 B1 | 2/2004 | Borella et al. |
| 6,701,377 B2 | 3/2004 | Burmann et al. |
| 6,704,317 B1 | 3/2004 | Dobson |
| 6,711,618 B1 | 3/2004 | Danner et al. |
| 6,714,979 B1 | 3/2004 | Brandt et al. |
| 6,718,383 B1 | 4/2004 | Hebert |
| 6,742,126 B1 | 5/2004 | Mann et al. |
| 6,745,229 B1 | 6/2004 | Gobin et al. |
| 6,748,413 B1 | 6/2004 | Bournas |
| 6,748,414 B1 | 6/2004 | Bournas |
| 6,760,758 B1 | 7/2004 | Lund et al. |
| 6,763,370 B1 | 7/2004 | Schmeidler et al. |
| 6,763,468 B2 | 7/2004 | Gupta et al. |
| 6,772,333 B1 | 8/2004 | Brendel |
| 6,772,334 B1 | 8/2004 | Glawitsch |
| 6,779,017 B1 | 8/2004 | Lamberton et al. |
| 6,779,033 B1 | 8/2004 | Watson et al. |
| 6,877,095 B1 | 4/2005 | Allen |
| 6,886,044 B1 | 4/2005 | Miles et al. |
| 6,892,307 B1 | 5/2005 | Wood et al. |
| 6,941,384 B1 | 9/2005 | Aiken, Jr. et al. |
| 6,952,728 B1 | 10/2005 | Alles et al. |
| 6,954,784 B2 | 10/2005 | Aiken, Jr. et al. |
| 6,963,917 B1 | 11/2005 | Callis et al. |
| 6,965,930 B1 | 11/2005 | Arrowood et al. |
| 6,996,617 B1 | 2/2006 | Aiken, Jr. et al. |
| 6,996,631 B1 | 2/2006 | Aiken, Jr. et al. |
| 7,010,605 B1 | 3/2006 | Dharmarajan |
| 7,013,482 B1 | 3/2006 | Krumel |
| 7,058,600 B1 | 6/2006 | Combar et al. |
| 7,058,718 B2 | 6/2006 | Fontes et al. |
| 7,058,789 B2 | 6/2006 | Henderson et al. |
| 7,069,438 B2 | 6/2006 | Balabine et al. |
| 7,076,555 B1 | 7/2006 | Orman et al. |
| 7,120,697 B2 | 10/2006 | Aiken, Jr. et al. |
| 7,143,087 B2 | 11/2006 | Fairweather |
| 7,167,927 B2 | 1/2007 | Philbrick et al. |
| 7,181,524 B1 | 2/2007 | Lele |
| 7,188,181 B1 | 3/2007 | Squier et al. |
| 7,218,722 B1 | 5/2007 | Turner et al. |
| 7,225,249 B1 | 5/2007 | Barry et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |

(56) References Cited

U.S. PATENT DOCUMENTS

| | | |
|---|---|---|
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,611 B2 | 9/2008 | Aiken, Jr. et al. |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,747,748 B2 | 6/2010 | Allen |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,965,727 B2 | 6/2011 | Sakata et al. |
| 7,970,934 B1 | 6/2011 | Patel |
| 7,979,585 B2 | 7/2011 | Chen et al. |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,099,492 B2 | 1/2012 | Dahlin et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,234,650 B1 | 7/2012 | Eppstein et al. |
| 8,239,445 B1 | 8/2012 | Gage et al. |
| 8,255,644 B2 | 8/2012 | Sonnier et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,989,192 B2* | 3/2015 | Foo .................. H04L 47/2441 370/392 |
| 8,990,262 B2 | 3/2015 | Chen et al. |
| 9,094,364 B2 | 7/2015 | Jalan et al. |
| 9,106,561 B2 | 8/2015 | Jalan et al. |
| 9,118,618 B2 | 8/2015 | Davis |
| 9,118,620 B1 | 8/2015 | Davis |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 9,386,088 B2 | 7/2016 | Zheng et al. |
| 9,497,201 B2 | 11/2016 | Chen et al. |
| 9,531,846 B2 | 12/2016 | Han et al. |
| 9,544,364 B2 | 1/2017 | Jalan et al. |
| 9,602,442 B2 | 3/2017 | Han |
| 9,609,052 B2 | 3/2017 | Jalan et al. |
| 9,661,026 B2 | 5/2017 | Chen et al. |
| 9,705,800 B2 | 7/2017 | Sankar et al. |
| 9,742,879 B2 | 8/2017 | Davis |
| 9,843,484 B2 | 12/2017 | Sankar et al. |
| 9,900,252 B2 | 2/2018 | Chiong |
| 9,906,422 B2 | 2/2018 | Jalan et al. |
| 9,906,591 B2 | 2/2018 | Jalan et al. |
| 9,942,152 B2 | 4/2018 | Jalan et al. |
| 9,942,162 B2 | 4/2018 | Golshan et al. |
| 9,954,899 B2 | 4/2018 | Chen et al. |
| 9,960,967 B2 | 5/2018 | Chen et al. |
| 9,961,135 B2 | 5/2018 | Kannan et al. |
| 9,979,801 B2 | 5/2018 | Jalan et al. |
| 9,986,061 B2 | 5/2018 | Jalan et al. |
| 9,992,107 B2 | 6/2018 | Jalan et al. |
| 10,002,141 B2 | 6/2018 | Jalan et al. |
| 2001/0015812 A1 | 8/2001 | Sugaya |
| 2001/0049741 A1 | 12/2001 | Skene et al. |
| 2002/0010783 A1 | 1/2002 | Primak et al. |
| 2002/0032777 A1 | 3/2002 | Kawata et al. |
| 2002/0078164 A1 | 6/2002 | Reinschmidt |
| 2002/0091831 A1 | 7/2002 | Johnson |
| 2002/0091844 A1 | 7/2002 | Craft et al. |
| 2002/0103916 A1 | 8/2002 | Chen et al. |
| 2002/0124089 A1 | 9/2002 | Aiken et al. |
| 2002/0133491 A1 | 9/2002 | Sim et al. |
| 2002/0138618 A1 | 9/2002 | Szabo |
| 2002/0141448 A1 | 10/2002 | Matsunaga |
| 2002/0143953 A1 | 10/2002 | Aiken |
| 2002/0143954 A1 | 10/2002 | Aiken et al. |
| 2002/0143991 A1 | 10/2002 | Chow et al. |
| 2002/0166080 A1 | 11/2002 | Attanasio et al. |
| 2002/0178259 A1 | 11/2002 | Doyle et al. |
| 2002/0178265 A1 | 11/2002 | Aiken et al. |
| 2002/0178268 A1 | 11/2002 | Aiken et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2002/0199000 A1 | 12/2002 | Banerjee |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0061402 A1 | 3/2003 | Yadav |
| 2003/0065762 A1 | 4/2003 | Stolorz et al. |
| 2003/0079146 A1 | 4/2003 | Burstein |
| 2003/0081624 A1 | 5/2003 | Aggarwal et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0152078 A1 | 8/2003 | Henderson et al. |
| 2003/0195962 A1 | 10/2003 | Kikuchi et al. |
| 2003/0202536 A1 | 10/2003 | Foster et al. |

(56) References Cited

U.S. PATENT DOCUMENTS

| | | |
|---|---|---|
| 2004/0001497 A1 | 1/2004 | Sharma |
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0184442 A1 | 9/2004 | Jones et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0253956 A1 | 12/2004 | Collins |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0141506 A1 | 6/2005 | Aiken et al. |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0212579 A1* | 9/2008 | LaVigne ............ H04L 12/4633 370/389 |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2008/0320151 A1 | 12/2008 | McCanne et al. |
| 2009/0037361 A1 | 2/2009 | Prathaban et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1* | 8/2009 | Dolganow .......... H04L 12/4633 370/395.5 |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0188975 A1 | 7/2010 | Raleigh |
| 2010/0205310 A1 | 8/2010 | Altshuler et al. |
| 2010/0210265 A1 | 8/2010 | Borzsei et al. |
| 2010/0217793 A1 | 8/2010 | Preiss |
| 2010/0223630 A1 | 9/2010 | Degenkolb et al. |
| 2010/0228819 A1 | 9/2010 | Wei |
| 2010/0235507 A1 | 9/2010 | Szeto et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1 | 1/2011 | Bryers et al. |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1 | 2/2011 | Singh et al. |
| 2011/0060831 A1 | 3/2011 | Ishii et al. |
| 2011/0064083 A1 | 3/2011 | Borkenhagen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |
| 2011/0276695 A1 | 11/2011 | Maldaner |

(56) References Cited

U.S. PATENT DOCUMENTS

| | | | |
|---|---|---|---|
| 2011/0276982 A1 | 11/2011 | Nakayama et al. |
| 2011/0289496 A1 | 11/2011 | Steer |
| 2011/0292939 A1 | 12/2011 | Subramaian et al. |
| 2011/0302256 A1 | 12/2011 | Sureshchandra et al. |
| 2011/0307541 A1 | 12/2011 | Walsh et al. |
| 2012/0008495 A1 | 1/2012 | Shen et al. |
| 2012/0023231 A1 | 1/2012 | Ueno |
| 2012/0026897 A1 | 2/2012 | Guichard et al. |
| 2012/0030341 A1 | 2/2012 | Jensen et al. |
| 2012/0066371 A1 | 3/2012 | Patel et al. |
| 2012/0084460 A1 | 4/2012 | McGinnity et al. |
| 2012/0106355 A1 | 5/2012 | Ludwig |
| 2012/0117571 A1 | 5/2012 | Davis et al. |
| 2012/0144014 A1 | 6/2012 | Natham et al. |
| 2012/0151353 A1 | 6/2012 | Joanny |
| 2012/0155495 A1 | 6/2012 | Clee et al. |
| 2012/0170548 A1 | 7/2012 | Rajagopalan et al. |
| 2012/0173759 A1 | 7/2012 | Agarwal et al. |
| 2012/0191839 A1 | 7/2012 | Maynard |
| 2012/0239792 A1 | 9/2012 | Banerjee et al. |
| 2012/0240185 A1 | 9/2012 | Kapoor et al. |
| 2012/0290727 A1 | 11/2012 | Tivig |
| 2012/0297046 A1 | 11/2012 | Raja et al. |
| 2013/0007225 A1 | 1/2013 | Gage et al. |
| 2013/0046876 A1 | 2/2013 | Narayana et al. |
| 2013/0058335 A1 | 3/2013 | Koponen et al. |
| 2013/0074177 A1* | 3/2013 | Varadhan ............ H04L 12/4633 726/15 |
| 2013/0083725 A1* | 4/2013 | Mallya ................. H04L 63/20 370/328 |
| 2013/0089099 A1 | 4/2013 | Pollock et al. |
| 2013/0091273 A1 | 4/2013 | Ly et al. |
| 2013/0124713 A1 | 5/2013 | Feinberg et al. |
| 2013/0148500 A1 | 6/2013 | Sonoda et al. |
| 2013/0166731 A1 | 6/2013 | Yamanaka et al. |
| 2013/0173795 A1 | 7/2013 | McPherson |
| 2013/0176854 A1 | 7/2013 | Chisu et al. |
| 2013/0191486 A1 | 7/2013 | Someya et al. |
| 2013/0191548 A1 | 7/2013 | Boddukuri et al. |
| 2013/0198385 A1 | 8/2013 | Han et al. |
| 2013/0250765 A1 | 9/2013 | Ehsan et al. |
| 2013/0258846 A1 | 10/2013 | Damola |
| 2013/0282791 A1 | 10/2013 | Kruglick |
| 2013/0311686 A1 | 11/2013 | Fetterman et al. |
| 2013/0329734 A1* | 12/2013 | Chesla ................ H04L 45/74 370/392 |
| 2014/0047115 A1 | 2/2014 | Lipscomb et al. |
| 2014/0258465 A1 | 9/2014 | Li |
| 2014/0286313 A1 | 9/2014 | Fu et al. |
| 2014/0298091 A1 | 10/2014 | Carlen et al. |
| 2014/0330982 A1 | 11/2014 | Jalan et al. |
| 2014/0334485 A1 | 11/2014 | Jain et al. |
| 2014/0359052 A1 | 12/2014 | Joachimpillai et al. |
| 2015/0085650 A1 | 3/2015 | Cui et al. |
| 2015/0156223 A1 | 6/2015 | Xu et al. |
| 2015/0215436 A1 | 7/2015 | Kancherla |
| 2015/0237173 A1 | 8/2015 | Virkki et al. |
| 2015/0312268 A1 | 10/2015 | Ray |
| 2015/0350048 A1 | 12/2015 | Sampat et al. |
| 2015/0381465 A1 | 12/2015 | Narayanan et al. |
| 2016/0044095 A1 | 2/2016 | Sankar et al. |
| 2016/0139910 A1 | 5/2016 | Ramanathan et al. |

FOREIGN PATENT DOCUMENTS

| | | |
|---|---|---|
| CN | 1473300 | 2/2004 |
| CN | 1529460 | 9/2004 |
| CN | 1575582 | 2/2005 |
| CN | 1714545 | 12/2005 |
| CN | 1725702 | 1/2006 |
| CN | 1910869 | 2/2007 |
| CN | 101004740 | 7/2007 |
| CN | 101094225 | 12/2007 |
| CN | 101163336 | 4/2008 |
| CN | 101169785 | 4/2008 |
| CN | 101189598 | 5/2008 |
| CN | 101193089 | 6/2008 |
| CN | 101247349 | 8/2008 |
| CN | 101261644 | 9/2008 |
| CN | 101495993 | 7/2009 |
| CN | 101878663 | 11/2010 |
| CN | 102143075 | 8/2011 |
| CN | 102546590 | 7/2012 |
| CN | 102571742 | 7/2012 |
| CN | 102577252 A | 7/2012 |
| CN | 102918801 A | 2/2013 |
| CN | 103365654 | 10/2013 |
| CN | 103533018 | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 | 7/2015 |
| CN | 102577252 B | 3/2016 |
| CN | 102918801 B | 5/2016 |
| EP | 0648038 | 4/1995 |
| EP | 1209876 | 5/2002 |
| EP | 1770915 | 4/2007 |
| EP | 1885096 | 2/2008 |
| EP | 2296313 | 3/2011 |
| EP | 2577910 | 4/2013 |
| EP | 2622795 | 8/2013 |
| EP | 2647174 | 10/2013 |
| EP | 2760170 A1 | 7/2014 |
| EP | 2772026 | 9/2014 |
| EP | 2901308 | 8/2015 |
| EP | 2760170 B1 | 12/2015 |
| HK | 1182560 | 11/2013 |
| HK | 1183569 | 12/2013 |
| HK | 1183996 | 1/2014 |
| HK | 1189438 | 1/2014 |
| HK | 1188498 | 5/2014 |
| HK | 1198565 | 5/2015 |
| HK | 1198848 | 6/2015 |
| HK | 1199153 | 6/2015 |
| HK | 1199779 | 7/2015 |
| HK | 1200617 | 8/2015 |
| IN | 3764CHN2014 | 9/2015 |
| IN | 261CHE2014 | 1/2016 |
| IN | 1668CHENP2015 | 7/2016 |
| JP | H0997233 | 4/1997 |
| JP | H1196128 | 4/1999 |
| JP | H11338836 | 12/1999 |
| JP | 2000276432 | 10/2000 |
| JP | 2000307634 | 11/2000 |
| JP | 2001051859 | 2/2001 |
| JP | 2001298449 | 10/2001 |
| JP | 2002091936 | 3/2002 |
| JP | 2003141068 | 5/2003 |
| JP | 2003186776 | 7/2003 |
| JP | 2005141441 | 6/2005 |
| JP | 2006332825 | 12/2006 |
| JP | 2008040718 | 2/2008 |
| JP | 2009500731 | 1/2009 |
| JP | 2013528330 | 7/2013 |
| JP | 2014504484 | 2/2014 |
| JP | 2014143686 | 8/2014 |
| JP | 2015507380 | 3/2015 |
| JP | 5855663 | 2/2016 |
| JP | 5906263 | 4/2016 |
| JP | 5913609 | 4/2016 |
| JP | 5946189 | 7/2016 |
| KR | 100830413 | 5/2008 |
| KR | 20130096624 | 8/2013 |
| KR | 101576585 | 12/2015 |
| KR | 101632187 | 6/2016 |
| WO | WO2001013228 | 2/2001 |
| WO | WO2001014990 | 3/2001 |
| WO | WO2001045349 | 6/2001 |
| WO | WO2003103237 | 12/2003 |
| WO | WO2004084085 | 9/2004 |
| WO | WO2006098033 | 9/2006 |

(56) References Cited

FOREIGN PATENT DOCUMENTS

| | | |
|---|---|---|
| WO | WO2008053954 | 5/2008 |
| WO | WO2008078593 | 7/2008 |
| WO | WO2011049770 | 4/2011 |
| WO | WO2011079381 | 7/2011 |
| WO | WO2011149796 | 12/2011 |
| WO | WO2012050747 | 4/2012 |
| WO | WO2012075237 | 6/2012 |
| WO | WO2012083264 | 6/2012 |
| WO | WO2012097015 | 7/2012 |
| WO | WO2013070391 | 5/2013 |
| WO | WO2013081952 | 6/2013 |
| WO | WO2013096019 | 6/2013 |
| WO | WO2013112492 | 8/2013 |
| WO | WO2014031046 | 2/2014 |
| WO | WO2014052099 | 4/2014 |
| WO | WO2014088741 | 6/2014 |
| WO | WO2014093829 | 6/2014 |
| WO | WO2014138483 | 9/2014 |
| WO | WO2014144837 | 9/2014 |
| WO | WO2014179753 | 11/2014 |
| WO | WO2015153020 | 10/2015 |

OTHER PUBLICATIONS

ACEdirector: 8-Port 10/100 MBPS Ethernet Web Switch, Alteon WebSystems, 1999, <http://www.andovercg.com/datasheets/alteon-ad3-ad4.pdf>, pp. 2.

Allot Communications Announces Business-Aware Network Policy Manager, Allot Communications, Sophia Antipolis, France, 1999, pp. 2.

Allot Communications Announces Directory Services Based Network Policy Manager, Allot Communications, Los Galos, California, 1999, pp. 2.

Allot Announces the General Availability of its Directroy Services-Based NetPolicy Manager, Allot Communications, Tel Aviv, Israel, 2000, pp. 2.

Allot Introduces Turnkey Next Generation IP Service and Creation Solution—The Virtual Bandwidth Manager, Allot Communications, Supercomm, 2000, 2 pgs.

Allot Communications Launches NetEnforcer with Netwizard, the Fastest Way to Implement Accurate and Reliable Network QoS Policies, Allot Communications, 2001, 2 pgs.

Allot Communications Announces the NetEnforcer Family of IP Traffic Management Products: Fault-Tolerant, Scaleable, Policy-Based Bandwidth Management, QoS, SLA Solutions, Allot Communications, 1999, 2 pgs.

Allot Communications Policy-Based Network Architecture, Allot Communications, 2001, pp. 1-12.

Apostolopoulos, et al., "Design, Implementation and Performance of a Content-Based Switch," INFOCOM, Nineteenth Annual Joint Conference of the IEEE Computer and Communications Societies. Proceedings, 2000, vol. 3, pp. 1117-1126.

Aron, et al., "Efficient Support for P-HTTP in Cluster-Based Web Servers," Proceedings of the Annual Conference on USENIX Annual Technical Conference, 1999, pp. 14.

Aron, "Scalable Content-Aware Request Distribution in Cluster-Based Network Servers," Department of Computer Science, Rice University, [online retreived Mar. 13, 2001], <URL:http://softlib.rice.edu/scalableRD.html>, pp. 8.

Aron, et al., "Scalable Content-Aware Request Distribution in Cluster-Based Networks Servers," Proceedings of the Annual Conference on USENIX Annual Technical Conference, 2000, pp. 15.

Cardellini, et al., "Dynamic Load Balancing on Web-Server Systems," IEEE Internet Computing, 1999, vol. 3 (3), pp. 28-39.

Dahlin, et al., "EDDIE: A Robust and Scalable Internet Server," 1998, http://www.eddie.org/, pp. 1-7 (Copy Unavailable).

Data Communications Awards Allot Communications "Hot Product" in Internetworking / IP Tools Catergory, Allot Communications, 1999, 2 pgs.

1.3.20 Device and Link Statement—Virtual Devices (VIPA), IP Configuration, IBM BookManager BookServer, 1998, <http://w3.enterlib.ibm.com:80/cgi-bin/bookmgr/books/F1AF7001/1.3.2>, pp. 3.

Devine, "TCP/IP Application Availability and Workload Balancing in the Parallel Sysplex," SHARE Technical Conference, 1999, pp. 17.

Enhancing Web User Experience with Global Server Load Balancing, Alteon WebSystems, 1999, pp. 8.

FreeBSD, "tcp—TCP Protocal," Linux Programme☐ s Manual [online], 2007, [retrieved on Apr. 13, 2016], Retreived from the Internet: <https://www.freebsd.org/cgi/man.cgi?query=tcp&apropos=0&sektion=7&manpath=SuSe+Linux%2Fi386+11.0&format=asci>.

Gite, "Linux Tune Network Stack (Buffers Size) to Increase Networking Performance," nixCraft [online], 2009, [retreived on Apr. 13, 2016], Retreived from the Internet: <URL:http://www.cyberciti.biz/faq/linux-tcp-tuning/>.

Goldszmidt, et al., "NetDispatcher: A TCP Connection Router," IBM Researc Report, RC 20853, 1997, pp. 1-31.

1.3.23 Home Statement, IP Configuration, IBM BookManager BookServer, 1998, <http://w3.enterlib.com:80/cgi-bin/bookmgr/books/F1AF7001/1.3.2>, pp. 6.

Kjaer, et al., "Resource Allocation and Disturbance Rejection in Web Servers Using SLAs and Virtualized Servers," IEEE Transactions on Network Service Management, 2009, vol. 6 (4), pp. 226-239.

Koike, et al., "Transport Middleware for Network-Based Control," IEICE Technical Report, 2000, vol. 100 (53), pp. 13-18.

Noguchi, "Realizing the Highest Level "Layer 7" Switch"= Totally Managing Network Resources, Applications, and Users =, Computer & Network LAN, 2000, vol. 18 (1), pp. 109-112.

Ohnuma, "AppSwitch: 7th Layer Switch Provided with Full Setup and Report Tools," Interop Magazine, 2000, vol. 10 (6), pp. 148-150.

Pai, et al., "Locality-Aware Request Distribution in Cluster-Based Network Servers," ASPLOS VIII Proceedings of the Eighth International Conference on Architectural Support for Programming Languages and Operating Systems, 1998, pp. 205-216.

Samar, "Single Sign-On Using Cookies for Web Applications," IEEE WETICE, 1999, pp. 158-163.

Sharifian, et al., "An Approximation-Based Load-Balancing Algorithm with Admission Control for Cluster Web Servers with Dynamic Workloads," The Journal of Supercomputing, 2010, vol. 53 (3), pp. 440-463.

Spatscheck, et al., "Optimizing TCP Forwarder Performance," IEEE/ACM Transactions on Networking, 2000, vol. 8 (2), pp. 146-157.

Takahashi, "The Fundamentals of the Windows Network: Understanding the Mystery of the Windows Network from the Basics," Network Magazine, 2006, vol. 11 (7), pp. 32-35.

The Next Step in Server Load Balancing, Alteon WebSystems, 1999, pp. 16.

1.3.1.2.5 Virtual IP Addressing (VIPA), IP Configuration, IBM BookManager BookServer, 1998, <http://w3.enterlib.ibm.com:80/cgi-bin/boolmgr/books/F1AF7001/1.3.2>, pp. 4.

Yamamoto, et al., "Performance Evaluation of Window Size in Proxy-Based TCP for Multi-Hop Wireless Networks," IPSJ SIG Technical Reports, 2008, vol. 2008 (44), pp. 109-114.

\* cited by examiner

PROCESSING DATA PACKETS USING A POLICY BASED NETWORK PATH

CROSS-REFERENCE TO RELATED APPLICATIONS

This patent application is a continuation of U.S. patent application Ser. No. 14/214,142, filed Mar. 14, 2014, which claims the priority benefit of U.S. Provisional Patent Application No. 61/799,244, filed Mar. 15, 2013, the disclosures of which are incorporated by reference herein in their entirety.

TECHNICAL FIELD

The present invention relates generally to data processing, and more particularly to processing data packets using a policy-based network path.

BACKGROUND

Data networks such as the Internet, enterprise data networks, mobile broadband networks, and cloud networks, have become an integral part of our lives. We use data networks to obtain news, gather product information, reserve a table for dinner, submit a payment, purchase a good, read a book, find a map, make or receive phone calls, conduct or join a conferencing event, participate in a meeting, work on a document, approve a promotion, chat with a friend, watch television and videos, book a plane ticket, and do many other things in our normal lifestyle or work style. Typically, we use a host computing device such as a smartphone, a tablet, a laptop, a personal computer, or a smart television, to communicate with an application service server to perform one or more tasks over a service session. The server is typically a computing device. The service session includes a plurality of data packets routing through a data network.

Currently, a host device sends data packets through the data network to the server device. Conversely the server device sends response data packets through the data network to the host device. The network path, in which data packets traverse from the host device to the server device, is pre-set by the data network using one or more network forwarding protocols such as Internet routing protocols, Ethernet protocols, and other layer 2 or layer 3 protocols. The network path typically consists of network switches and routers.

The data packets of the service session is usually subjected to a number of inspections and controls before the data packets are delivered to the destination host device or server device. These network inspections and controls are performed by special network application appliances. There are security related inspections and controls such as IDS (intrusion detection system), firewall, lawful interception, malware detection and many others. There are company specific security inspections and controls that detects for document transfer, email scan, user access control, and others. There are network traffic inspections and controls such as bandwidth management, quality of service, tariff control and others. There are network monitoring inspections and controls such as rating, sampling, packet tracing and others. There are network optimization inspection and controls such as content caching, data de-duplication, email access optimization, and others.

It is very common for a network administrator to deploy one or more such network inspections and controls to a service session. In order for the inspection and control to function properly, a network administrator must know the preset network path of the service session and deploy the network application appliance along the preset network path. To assure the service session is subjected to the inspection and control function of the deployed network application appliance, the network administrator also needs to engineer and plan the data network such that any changes, due to a change of the network switches and routers, from the preset network path to a new preset network path, the new preset network path needs to include the deployed network application appliance.

Additionally, network inspection and control functions are usually computing and/or resource intensive. When their capacities are reached, the network administrator needs to deploy additional network application appliances or utilize other less busy network application appliances in the data network. Deploying additional network application appliances requires, as mentioned above, careful planning and engineering of the data network in order for the plurality of network application appliances to share the processing or resource load, and to ensure the network paths of a plurality of service sessions to pass through the plurality of network application appliances in an evenly distributed manner. Utilizing other less busy network application appliances is often not possible as the network paths are pre-determined by the networking protocols outside the scope of the network application appliance.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for processing a data packet using a policy-based network path. Specifically, according to one approach of the present disclosure, a system for mitigating a DDoS attack is provided. The system may include a policy enforcing point and a database configured to store one or more policy-based network paths. The policy enforcing point may be configured to receive, from a client, the data packet associated with a service session. The policy enforcing point may be further configured to determine data packet information associated with the data packet. Based on the data packet information and one or more packet processing criteria, the policy enforcing point may determine the policy-based network path for the data packet. Based on the determination of the policy-based network path, the policy enforcing point may route the data packet along the policy-based network path.

According to another approach of the present disclosure, there is provided a method for processing a data packet using a policy-based network path. The method may commence with receiving the data packet associated with a service session from a client. The method may continue with determining data packet information associated with the data packet. The method may further include determining the policy-based network path for the data packet based on the data packet information and one or more packet processing criteria. The method may continue with routing, based on the determination of the policy-based network path, the data packet along the policy-based network path.

Additional objects, advantages, and features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

In various embodiments, a policy-based data network adapts a policy-based data network path for a service session between a client device and an application service server device in order to apply one or more network inspections and controls over the service session.

A policy-based data network may be a data network connected to a plurality of network application appliances, which perform one or more inspection and control functions over a service session. The policy-based data network path may include an indication of one or more network application appliances corresponding to one or more network inspections and controls. The indication may include an order of the one or more network application appliances, where the policy-based data network forwards the data packets of the service session through the one or more network appliances according to the indicated order.

Figure 1:
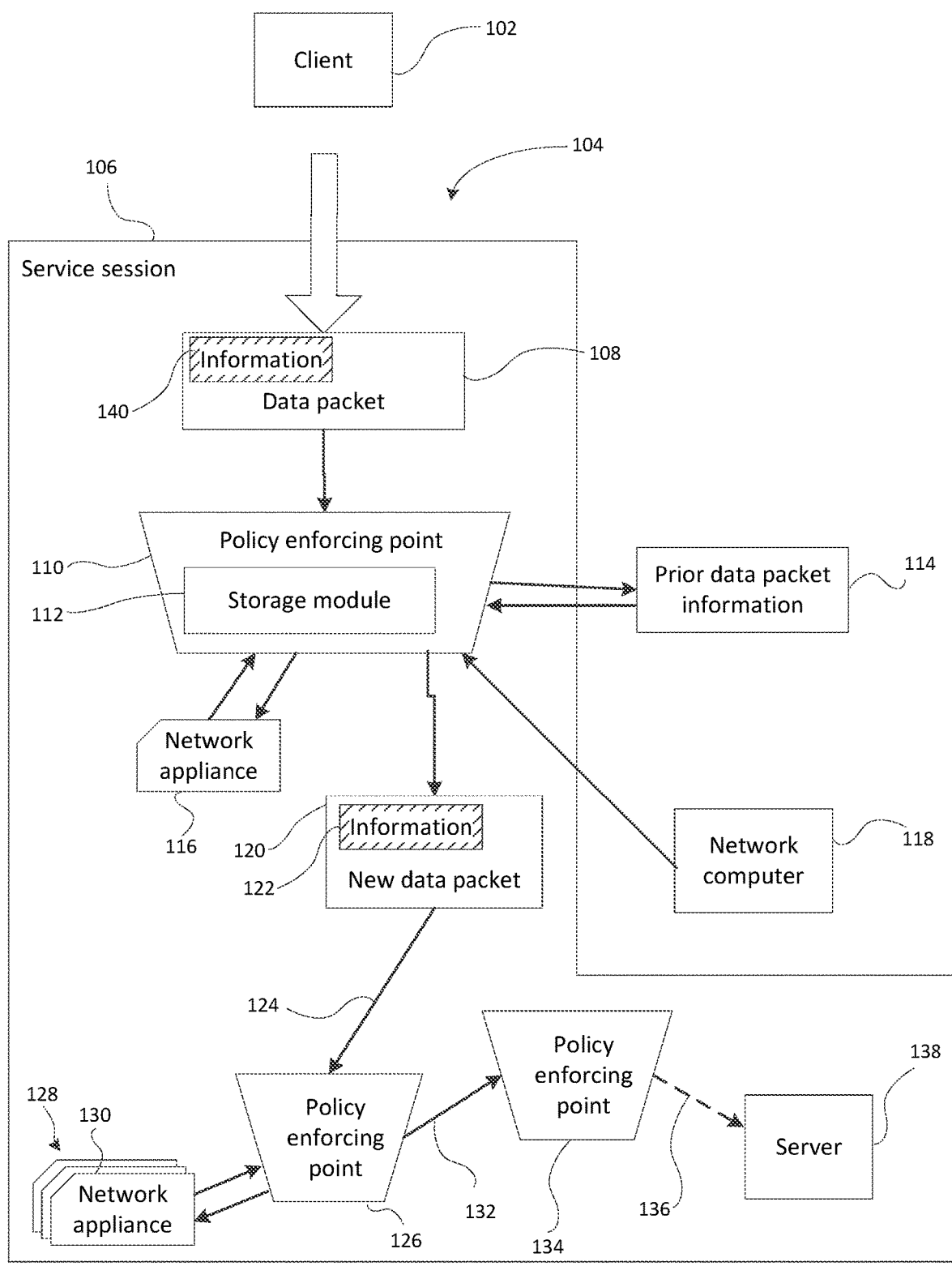
FIG. 1 is a block diagram illustrating an environment within which a method can be implemented for routing a data packet along a policy-based network path from a client to a server.

Turning now to the drawings, FIG. 1 shows an example embodiment in which the client device 102 may be a computing device connected to the policy-based data network 104 using a network module of the client device. The client device may be a personal computer, a laptop computer, a tablet, a smartphone, a mobile phone, an Internet phone, a netbook, a home gateway, a broadband gateway, a network appliance, a set top box, a media server, a personal media play, a personal digital assistant, an access gateway, a networking switch, a server computer, a network storage computer, or any computing device comprising a network module and a processor module.

The application service server device or server device 138 may be a server computer connected to the policy-based data network using a network module of the server computer. The application service server device includes a processing module and a storage medium. The storage medium may include executive instructions that, when executed by the processing module of the application service server device, performs a function to serve an application service requested by the client device. The application service server device may serve the application service requested by the client device over a service session 106 where the server device and the client device exchange data packets over the service session. At least some of the data packets of the service session may be processed through the policy-based data network.

The policy-based data network may comprise a plurality of network elements. These network elements may include network switches such as Ethernet switches, ATM switches, optical switches and other data packet switches. These network elements may further include network routers such as IP routers, wireless network elements, or cellular base stations. In various embodiments, data packets of the service session may be processed and forwarded by one or more of these network elements. The policy-based data network may be connected to one or more of these network elements.

In the present embodiment, the policy-based data network may include one or more policy enforcing points 110. A policy enforcing point 110 may be a networking element that includes a processor module, a network module and a storage module 112. The storage module 112 may store a plurality of programming instructions that, when executed by the processor module, perform one or more functions of this invention. The network module may connect to one or more other policy enforcing points 110. The policy enforcing point 110 may connect to a network application appliance 116 performing network inspection, load balancing or control function.

In various embodiments, a policy enforcing point 110 may connect to a network application appliance 116 and send data packets of the service session 106 to the network application appliance 116 according to the policy-based data network path. The policy enforcing point 110 may receive a data packet 108 of the service session 106 from the network application appliance 116. The policy enforcing point 110 determines the data packet to be processed according to the policy-based data network path and processes the data packet based on the policy-based data network path and the network application appliance 116.

In various embodiments, a network application appliance 116 may include a processor module, a network module and a storage module. The storage module may include a plurality of programming instructions which, when executed by the processor module, performs a network application function. A network application function may include one or more security functions such as intrusion detection, malware detection, firewalling, lawful interception, email scanning, or virus detection. A network application function may also include one or more traffic management functions such as bandwidth management, bandwidth tariff policing, quality of services policing, or traffic steering. Additionally, a network application function may include one or more corporate security policing functions such as content detection, file transfer detection, service proxy like web proxy, SSL proxy, or IPSec proxy, application identification, public user identity identification, private user identity identification, access control, or user authentication. Furthermore, a network application function may include one or more service optimization functions such as content caching, email and document caching, data de-duplication, video caching, server load balancing, global server load balancing, or DNS optimization. A network application function may also include one or more traffic tracking functions such as packet counting, statistics sampling, application service rating, or client device rating.

In some embodiments, the policy-based data network path 124, 132, 136 includes a client-side policy enforcing point 126. The client-side policy enforcing point 110 receives a data packet 108 of the service session 106 from the client device 102. The client-side policy enforcing point 110 may select a policy-based network path 124, 132, 136 based on the data packet 108.

The client-side policy enforcing point 110 may retrieve information 140 from the data packet 108. The data packet information may include one or more of the layer 2 information such as a MAC address or a network interface number, layer 3 addresses such as source IP address and destination IP address, layer 4 address information such as source TCP/UDP port, destination TCP/UDP port, and TCP/UDP option, application layer content information such as URL, cookie information, transaction identity, DNS identity, session identity, receiving time of the data packet, and data packet information 114 from a prior data packet. The client-side policy enforcing point 110 may combine the data packet information 140 together with the information from prior data packets 114 of the service session 106 from the client device 102 to perform the selection. The client-side policy enforcing point 110 may also obtain additional information regarding the data packet by querying a network computer 118, based on the retrieved data packet information 140. Data packet information as used herein may refer to the combination of the retrieved information 140 from the data packet 108, the information from prior data packets 114 and the additional information obtained from another computer. The client-side policy enforcing point 110 may use the data packet information 140 to select the policy-based data network path 124, 132, 136.

Figure 2:
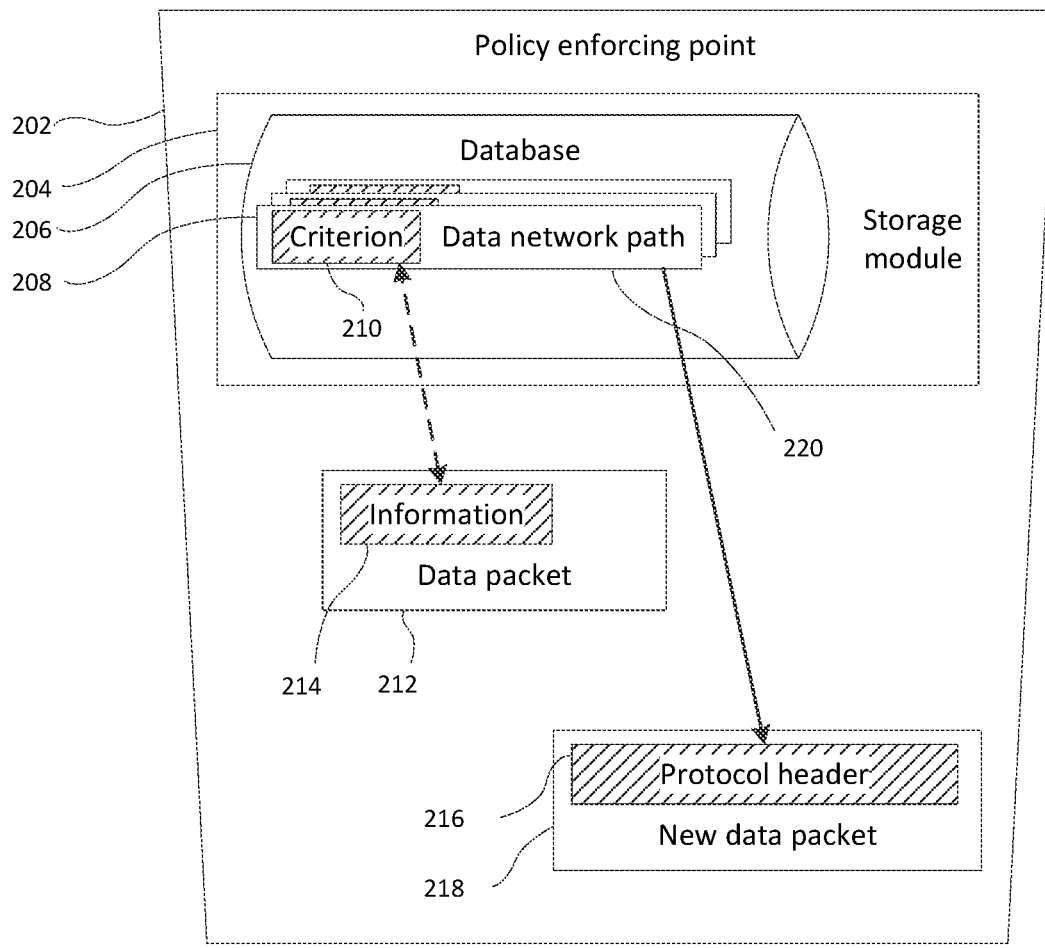
FIG. 2 is a block diagram of a detailed representation of a client-side policy enforcing point.

Turning now to FIG. 2, in some embodiments, the storage module 204 of the client-side policy enforcing point 202 may include a database 206 of policy-based data network paths 208. A policy-based data network path 208 in the database 206 may be associated with a packet processing criterion 210. The client-side policy enforcing point 202 matches the data packet information 214 with the packet processing criterion 210. When the client-side policy enforcing point 202 determines the data packet information 214 matches the packet processing criterion 210, the client-side policy enforcing point 202 may select the policy-based data network path 220. In one embodiment, the packet processing criterion 210 includes a destination IP address, a source IP address, a MAC address, a network interface number, a layer 4 port number, a source layer 4 port number, a destination layer 4 port number, an URL, an user identity, a cookie value, a time value, an identity, other information in the packet or a combination of one or more of the above.

In some embodiments, the policy enforcing point 202 may create a new data packet 218 which comprises the data packet 212 and a protocol header 216 which contains the selected policy-based data network path 220.

In various embodiments, the selected network path 220 includes an order list of policy enforcing points and their associated network application appliances, and may be used to process the data packet 212. In one embodiment, the selected network path 220 includes an order list of network application appliances. The client-side policy enforcing point 202 determines an order list of policy enforcing points corresponding to the order list of network application appliances. Each determined policy enforcing point may connect to the corresponding network application appliance. The client-side policy enforcing point 202 may use the determined order list of policy enforcing points as the selected network path to process the data packet 212.

In other embodiments, the selected network path 220 does not include the client-side policy enforcing point 202. The client-side policy enforcing point 202 updates the selected network path 220 to include the client-side policy enforcing point 202 as the first policy enforcing point. The client-side policy enforcing point 202 may not update the selected network path 220.

Returning now to FIG. 1, in other embodiments, the client-side policy enforcing point 108 may examine the network path 124, 132, 136 and select a next policy enforcing point 126. The client-side policy enforcing point 110 may identify itself in the network path 124, 132, 136. The client-side policy enforcing point 110 may select the policy enforcing point 126 following the client-side policy enforcing point 110 in the order list of policy enforcing points of the network path 124, 132, 136. The client-side policy enforcing point 110 may select the first policy enforcing point in the order list of policy enforcing points of the network path 124, 132, 136 as the next policy enforcing point 126. The client-side policy enforcing point 110 may send the data packet 108 to the next policy enforcing point 126. The client-side policy enforcing point 110 may generate a new data packet 120 based on the data packet 108 and the network path 124, 132, 136, and send the new data packet 120 to the next policy enforcing point 126. The client-side policy enforcing point 110 may then include this data packet 108 into the new data packet 120, and the network path 124, 132, 136. The client-side policy enforcing point 110 may encapsulate the network path 124, 132, 136 into a layer 2 protocol header such as a VLAN header or a MPLS header. The client-side policy enforcing point 110 may also establish a communication session such as an IP tunneling session (IP in IP session, L2TP tunnel, IPSec tunnel), or other tunneling mechanism and generate the new data packet 120 for the tunnel. The client-side policy enforcing point 110 may include the data packet 108 and network path 124, 132, 136 as the content of the new data packet 120.

In the present embodiments, the client-side policy enforcing point 110 may include a portion of the network path 124, 132, 136 in the new data packet 120. The client-side policy enforcing point 110 may include the portion of the order list starting from the next policy enforcing point 126. Alternately, the client-side policy enforcing point 110 may include the entire network path 126 in the new data packet 120.

In various embodiments, the client-side policy enforcing point 110 may send the network path 124, 132, 136 to the next policy enforcing point 126 in a different communication session. The client-side policy enforcing point 110 may also send the network path 124, 132, 136 to the next policy enforcing point 126 prior to sending the data packet 108 or the new data packet 120 to the next policy enforcing point 126.

In the present embodiments, the client-side policy enforcing point 110 may send the data packet 108 or the new data packet 120 to the next policy enforcing point 126 using the policy-based data network. The client-side policy enforcing point 110 may also send the data packet 108 or the new data packet 120 to the next policy enforcing point 126 using the connected network elements.

In various embodiments, a policy enforcing point 126 may receive a client device data packet 108 from another policy enforcing point, such as the client-side policy enforcing point 110. The policy enforcing point 126 may also retrieve the client device data packet 108 from a data packet 120 in a communication session between the policy enforcing point 126 and the other policy enforcing point 134. The policy enforcing point 126 may retrieve a network path 124, 132, 136 associated with the client device data packet 108. The policy enforcing point 126 may further retrieve the network path 124, 132, 136 from the data packet 120 in the communication session between the policy enforcing point 126 and the other policy enforcing point 134. The policy enforcing point 126 may also retrieve the network path 124, 132, 136 received prior to receiving the client device data packet 108.

In various embodiments, the policy enforcing point 126 may examine the order list of policy enforcing points in the network path 124, 132, 136 and select a network application appliance. The policy enforcing point may also identify itself in the order list of policy enforcing points and select an associated network application appliance 130 to itself in the order list of policy enforcing points. Furthermore, the policy enforcing point 126 may select the first associated network application appliance in the order list of policy enforcing points.

The policy enforcing point 126 in the order list in the network path 124, 132, 136 may be associated with a plurality of network application appliances 128, such as an order list of a plurality of network application appliances. The policy enforcing point 126 may select the first associated network application appliance 130 in the order list of a plurality of network application appliances 128.

In some embodiments, the policy enforcing point 126 may send the client device data packet 108 to the selected network application appliance 130. The policy enforcing point 126 may establish a communication session with the selected network application appliance 130 and send the client device data packet 108 over the communication session.

The network application appliance 130 may receive the client device data packet 108, process the client device data packet 108 and send the resulting client device data packet 108 to the policy enforcing point 126. The network application appliance 130 may also modify the client device data packet 108 as a result of processing the client device data packet 108. The network application appliance 130 may send the client device data packet 108 over the communication session with the policy enforcing point 126.

In various embodiments, the policy enforcing point 126 may receive the client device data packet 108 from the network application appliance 130. The policy enforcing point 126 may select a network path 136 for the client device data packet 108. The policy enforcing point 126 may select the previously received network path 124, 132, 136. The policy enforcing point may recognize that the client device data packet 108 may be received from the communication session with the network application appliance 130, and select the previously received network path 124, 132, 136 associated with the communication session. The policy enforcing point 126 may obtain information about the client device data packet 108 similar to the corresponding method employed by the client-side policy enforcing point 108 to obtain the client device data packet information 122. The policy enforcing point 126 may include a database of network paths in its storage module. The policy enforcing point 126 may match the client device data packet information 122 with the database of network paths to select the network path 136.

In various embodiments, the policy enforcing point 126 processes the client device data packet 108 received from the application appliance 130 using the selected network path 132, 136. The policy enforcing point 126 may select a next policy enforcing point 134 from the selected network path. The policy enforcing point 126 may also identify itself in the order list of policy enforcing points in the network path, and select a policy enforcing point immediately following itself in the order list. Alternately, the policy enforcing point 126 may select a first policy enforcing point in the order list.

In various embodiments, the policy enforcing point 126 may send the client device data packet to the next policy enforcing point 134. The policy enforcing point 126 may generate a new data packet using the client device data packet 108 and the network path 132, 136. The policy enforcing point 126 may include a portion of the network path 132, 136 into the new data packet. The policy enforcing point 126 may include the portion of the order list of policy enforcing points starting from the next policy enforcing point 134. Alternately, the policy enforcing point 126 may include the entire network path 124, 132, 136 in the new data packet. In one embodiment, the policy enforcing point 126 includes the client device data packet 108 into the new data packet.

In some embodiments, the policy enforcing point 134 may determine that the retrieved network path does not yield a next policy enforcing point. The network path may be empty, or the policy enforcing point may be the last entry in the order list of policy enforcing points in the network path 124, 132, 136. The policy enforcing point 134 may send the client device data packet to the application service server device 138 indicated in the client device data packet 108. The policy enforcing point 134 may send the client device data packet 108 to the application service server device 138 through the policy-based data network or through the connected network switches. In this embodiment, the policy enforcing point 134 may be a server-side policy enforcing point.

The application service server device 138 may receive the client device data packet 108 and process the data packet 120 from the service session 106. The application service server device 138 may send a data packet towards the client device over the service session 106.

Figure 3:
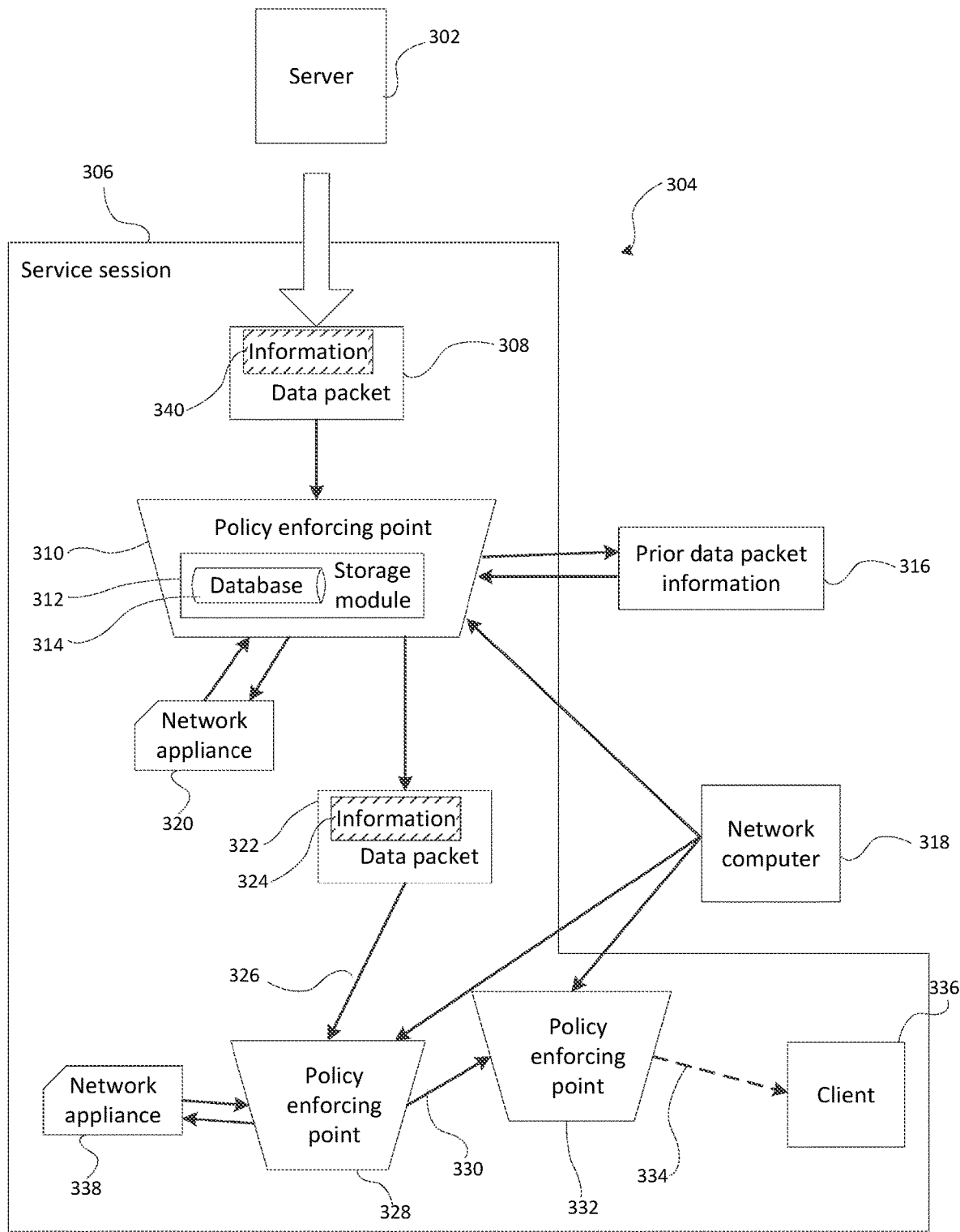
FIG. 3 shows a system which implements a method for routing a data packet along a policy-based network path from a server to a client.

Turning now to FIG. 3, in some embodiments, the server-side policy enforcing point 310 may receive a server device data packet 308 over the service session 306. The server-side policy enforcing point 310 retrieves information 340 from the server device data packet 308. In some embodiments, the server device data packet 308 information 340 includes layer 2 address information such as MAC address, VLAN identity, MPLS label; layer 3 address information such as an IP address, a source IP address, or a destination IP address; layer 4 information such as a source TCP/UDP port number, a destination TCP/UDP port number, TCP/UDP option value; application layer information such as a cookie, an error code, a protocol transaction identity like DNS identity; application content information such as a document file name, a command string; or some other content within the data packet 308.

Figure 4:
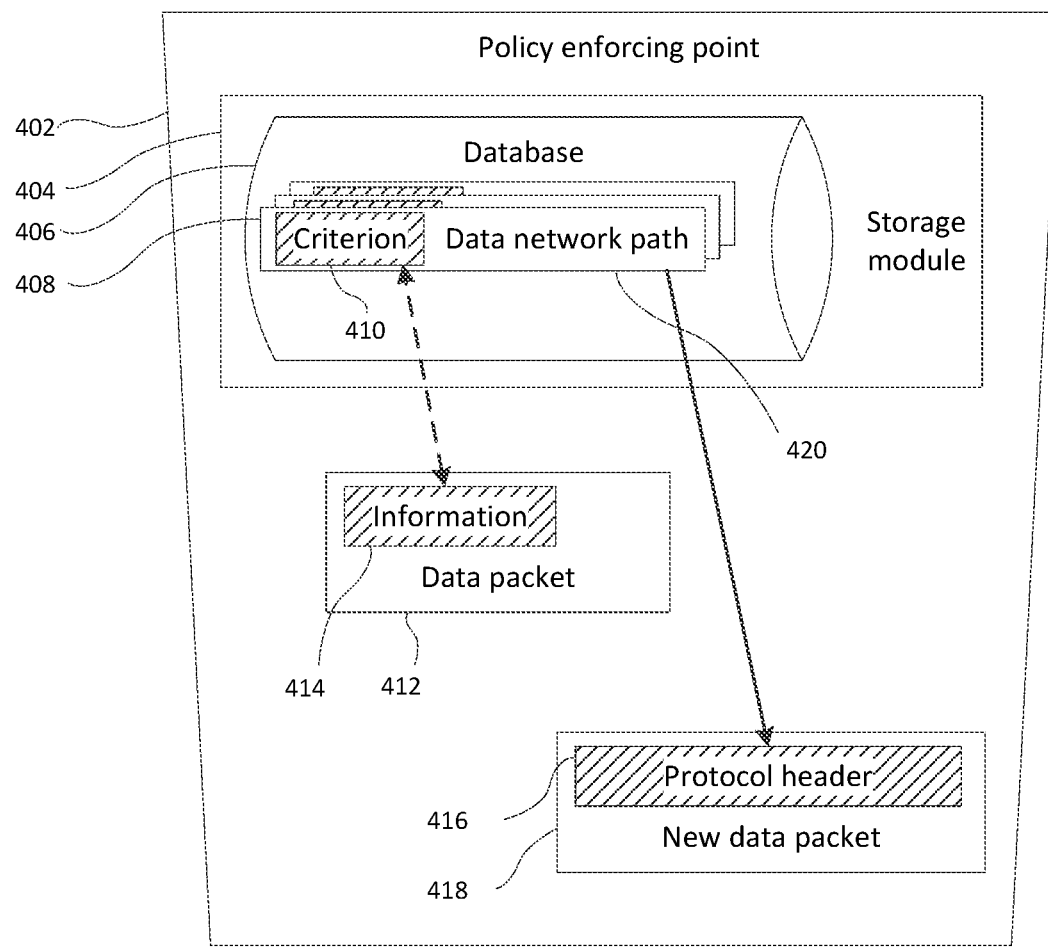
FIG. 4 is a block diagram illustrating a server-side policy enforcing point.

Referring now to FIG. 4, in some embodiments, the server-side policy enforcing point 402 includes a storage module 404 which contains a database 406 of network paths 408, where each network path in the database may be associated with a packet processing criterion 410. The server-side policy enforcing point 402 matches the server device data packet information 414 against the database 406. The server-side policy enforcing point 402 may determine the server device data packet information 414 matches a packet processing criterion 410 of a network path 408 in the database 406. The server-side policy enforcing point 406 selects the network path.

Returning now to FIG. 3, the server device data packet 308 may also include an indication indicating that the server device data packet 308 may be destined towards the client device 336. The server-side policy enforcing point 310 retrieves the indication and determines the data packet 308 may be a server device data packet.

In other embodiments, the server-side policy enforcing point 310 determines that the server device data packet 308 may be destined towards the client device 336 by examining the layer 2 or layer 3 information of the server device data packet 308. The server device data packet 308 may be an IP packet and the server-side policy enforcing point 310 examines the source IP address, which may be an IP address belonging to a server device. The server-side data packet 308 may be an IP tunnel packet and the server-side policy enforcing point 310 examines the destination IP address, which may be an IP address of the server-side policy enforcing point 310. The server-side data packet 308 may include a VLAN identity and the server-side policy enforcing point 310 may determine that the VLAN identity is a pre-determined identity indicating the server device data packet 308 may be from a server device 302.

In various embodiments, the server-side policy enforcing point 310 examines the selected network path 326, 330, 334. The server-side policy enforcing point 310 may identify itself in the order list of policy enforcing points in the selected network path 326, 330, 334. The server-side policy enforcing point 310 selects itself as the policy enforcing point to process the data packet 308. The server-side policy enforcing point 310 may also determine itself in the order list may be associated with a network application appliance 320, the server-side policy enforcing point 310 sends the server device data packet 308 to the associated network application appliance 320.

In some embodiments, a server-side policy enforcing point 310 determines itself in the order list of policy enforcing points may be not associated with a network application appliance. The server-side policy enforcing point 310 may also select the policy enforcing point in the order list of policy enforcing points preceding itself in the order list. The server-side policy enforcing point 310 may send the server device data packet 308 to the selected policy enforcing point 328.

In an alternate embodiment, a server-side policy enforcing point 332 does not find any policy enforcing point in the order list of preceding policy enforcing points preceding. The server-side policy enforcing point 332 may send the server device data packet 308 to the client device 336.

If a server-side policy enforcing point 328 does not find itself in the order list of policy enforcing points in the selected network path 326, 330, 334, the server-side policy enforcing point 328 may select a last entry policy enforcing point 332 in the order list of policy enforcing points. The server-side policy enforcing point 328 sends the server device data packet 308 to the selected policy enforcing point 332.

In one embodiment, a server-side policy enforcing point 332 fails to select a policy enforcing point from the order list of policy enforcing points in the selected network path 326, 330, 334, and the server-side policy enforcing point 332 consequently sends the server device data packet 308 to the client device 436.

In some embodiments, a network application appliance 320 receives a server device data packet 308, processes the data packet 308, and sends the server device data packet 308 to a policy enforcing point 310. The network application appliance 320 may also modify the server device data packet 308 prior to sending to the policy enforcing point 310.

In various embodiments, a policy enforcing point 328 receives a server device data packet 322 from a network application appliance 332. The policy enforcing point 328 selects a network path 330, 334 to process the server device data packet 322. The policy enforcing point may retrieve the network path 330, 334 from the server device data packet 322. The policy enforcing point 328 may retrieve information 324 about the server device data packet 322 and select the network path 330, 334 using the server device data packet information 324. The policy enforcing point 328 may determine that the server device data packet 322 is destined towards the client device 336, by either obtaining an indication inside the server device data packet 322 or examining the layer 2 or layer 3 information of the server device data packet 322, as illustrated earlier.

The policy enforcing point 328 may select a policy enforcing point 332 or a network application appliance 338 from the order list of policy enforcing points of the selected network path, using a similar process illustrated herein in the embodiments for a server-side policy enforcing point. The policy enforcing point sends the server device data packet 322 to the selected policy enforcing point 332, or to the selected network application appliance 338.

In some embodiments, the policy enforcing point 332 may fail to select a policy enforcing point or a network application appliance, and consequently may send the server device data packet 322 to the client device 336.

In various embodiments, the policy-based data network 304 may connect to a network computer 318. The policy enforcing points 310, 328, 332 of the policy-based data network 304 may access the network computer 318. The network computer may be considered as a portion of the storage module 312 of each policy enforcing point.

The network computer 318 may include a database of network paths, which may be accessible to a policy enforcing point 310. When a policy enforcing point 310 accesses a database of network paths 314, the policy enforcing point 318 may access the database of network paths in the network computer 318. A network path in the network computer 318 may be associated to a network path identity. When a policy enforcing point 310 incorporates a network path 326 into a data packet illustrated in FIG. 2 for an embodiment described earlier in this invention, the policy enforcing point 310 may include a network path identity associated to the network path 326 into the data packet 322. When a policy enforcing point 328 retrieves a network path from a data packet 322, the policy enforcing point 328 may retrieve a network path identity from the data packet, match the network path identity with the network computer 318 and retrieve the network path 326 wherein the retrieved network path identity from the data packet 322 matches a network path identity associated to the retrieved network path 326 from the network computer 418.

In various embodiments, the network computer 318 may be a computing device connected to the policy-based data network 304, or a distributed database. The network computer 318 may include storage modules of one or more policy enforcing points 310, 328, 332 in the policy-based data network 304.

In some embodiments, the policy-based data network may be connected to a policy controller. The policy controller may be a network computing device comprising a storage module, a processor module and a network module. The network module of the policy controller may connect to the policy-based data network. The storage module of the policy controller includes one or more programming instructions which when executed by the processor module performs one or more functions illustrated herein.

In some embodiments, the policy controller may send a network path to a policy enforcing point wherein the policy enforcing point stores the network path into its storage module. The policy controller may also send a network path to be stored in the network storage. In various embodiments, a policy enforcing point receives all the network paths in its storage module from the policy controller. The network storage may also receive all the network paths from the policy controller.

The policy controller may also include the network storage, and store the network path into the network storage.

In various embodiments, a policy-based network path includes an indication to a plurality of network inspection and control functions which are associated to a plurality of network application appliances corresponding to the network inspection and control functions. A policy enforcing point selects a network application appliance associated to a network inspection and control function to process a client device or server device data packet.

A policy enforcing point may include functionality to perform a network inspection and control function. A policy enforcing point may also perform as a network application appliance.

In some embodiments, a network application appliance may include a plurality of devices serving the associated network inspection or control function. A network application appliance may also include a cluster of devices, a virtual chassis of devices, or a plurality of devices distributed over a data network. In various embodiments, a policy enforcing point selects a device of the network application appliance.

A policy enforcing point may modify a network path based on the information obtained from a client device or server device data packet. A policy enforcing point may also modify the network path by inserting another policy enforcing point and/or another network application appliance/network inspection or control function into the network path. Further, a policy enforcing point may remove or replace a policy enforcing point, a network application appliance or a network inspection or control function from the network path.

A server-side policy enforcing point may select a network path different from the network path used in processing the client-side data packet of the service session. In some embodiments, both the server-side policy and the client-side policy can process the data packets containing information concerning corporate information security policy, document transfer, virus scanning, phishing, email scanning, and the like. The client-side policy can also process data packets containing information concerning corporate information policy, document transfer, virus scanning, and the like. Additionally, the client-side can enable checking the data packets for intrusion, distributed denial of services (DDOS) attacks, network scanning, and so forth.

When processing a current client device data packet, a client-side policy enforcing point may retrieve the network path, selected to process a prior client device data packet of the service session, to process the current client device data packet.

In various embodiments, the client device establishes a service with the service device where the service includes a plurality of service sessions. The service may be a SIP service, an FTP service, a video conferencing service, or a collaboration service. In one embodiment, the client-side policy enforcing point selects a network path to process a first service session of the service. The client-side policy enforcing point stores the relationship between the selected network path with the service into its storage module. When the client-side policy enforcing point processes a client device data packet of a second service session, the client-side policy enforcing point determines that the second service session, based on the client device data packet information, may be associated to the service. The client-side policy enforcing point retrieves from its storage module the network path of the service and uses the retrieved network path to process the client device data packet of the second service session. The client-side policy enforcing point may also select a network path different from the network path of the first service session to process the second service session. The client-side policy enforcing point may use a network path to process a SIP signaling session of a SIP service and use a different network path to process a SIP media session of the SIP service. The client-side policy enforcing point may use a network path to process an FTP control session of an FTP service and use a different network path to process an FTP data session of the FTP service.

In various embodiments, the client-side policy enforcement point processes a prior data packet of the service session and stores the selected network path processing the prior data packet, and the prior data packet information in the storage module of the client-side policy enforcement point. The client-side policy enforcement point subsequently receives a data packet of the service session. The client-side policy enforcement point combines the current data packet information and the prior data packet information to determine a change to the selected network path for the prior data packet. The client-side policy enforcement point modifies the selected network path to become the selected network path to process the current data packet.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment," "an embodiment," "various embodiments," or "some embodiments" means that a particular feature, structure, or characteristic described in connection with the embodiment can be included in at least one embodiment of the invention. The appearances of these phrases in various places in the specification are not necessarily all referring to the same embodiment, nor are separate or alternative embodiments mutually exclusive of other embodiments. Further, the order of blocks in process flowcharts or diagrams, if any, representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

The invention can be implemented in software, hardware or a combination of hardware and software. A number of embodiments of the invention can also be embodied as computer readable code on a computer readable medium. The computer readable medium may be any data storage device that can store data which can thereafter be read by a computer system. Examples of the computer readable medium include read-only memory, random-access memory, CD-ROMs, magnetic tape, optical data storage devices, solid state storage drives, hard disk drives, and carrier waves. The computer readable medium can also be distributed over network-coupled computer systems so that the computer readable code may be stored and executed in a distributed fashion.

Figure 5:
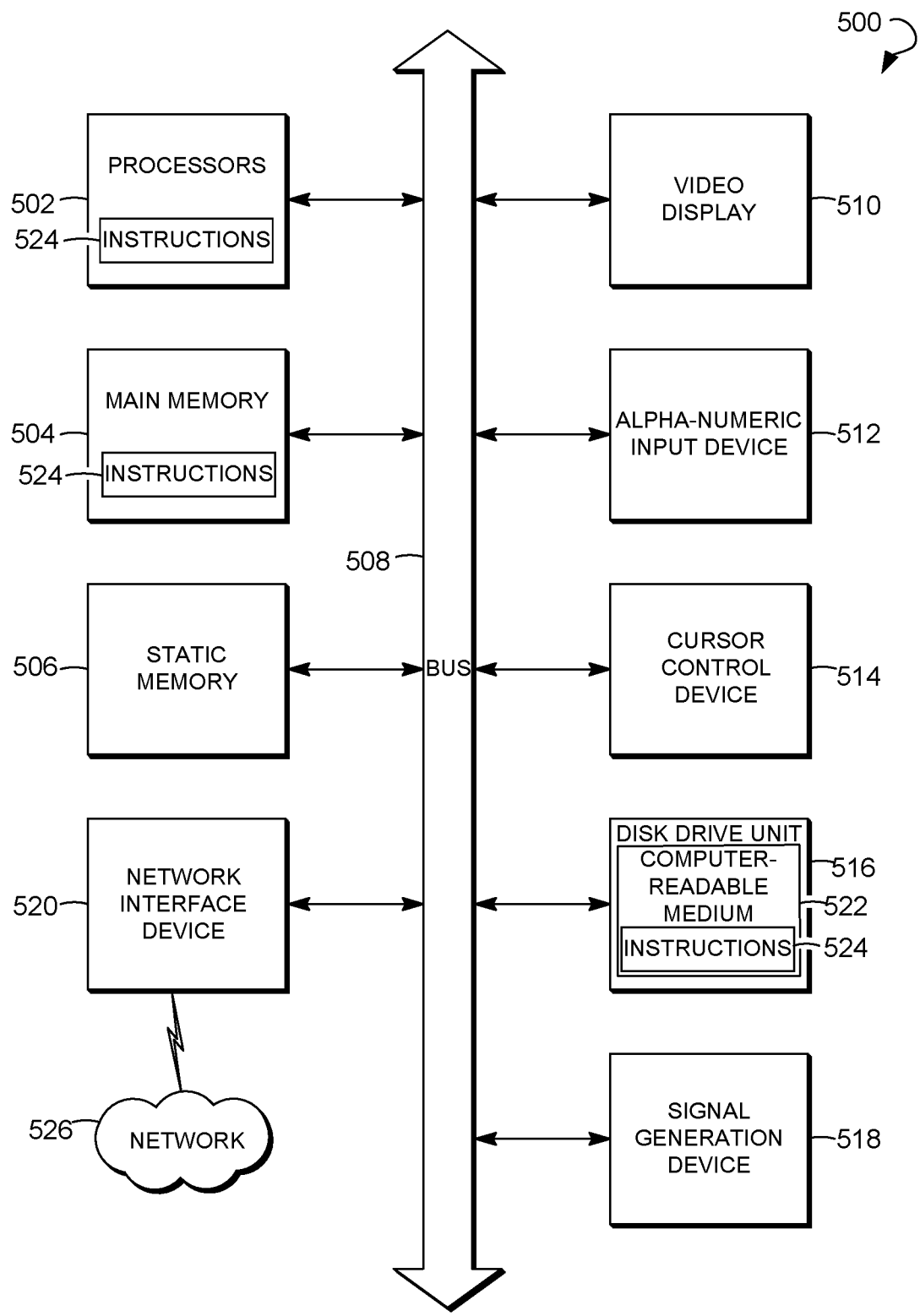
FIG. 5 shows a diagrammatic representation of a computing device for a machine in the example electronic form of a computer system, within which a set of instructions for causing the machine to perform any one or more of the methodologies discussed herein can be executed.

FIG. 5 shows a diagrammatic representation of a machine in the example electronic form of a computer system 500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a PC, a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 may also include an alphanumeric input device 512 (e.g., a keyboard), a cursor control device 514 (e.g., a mouse), a disk drive unit 516, a signal generation device 518 (e.g., a speaker), and a network interface device 520.

The disk drive unit 516 includes a non-transitory computer-readable medium 522, on which is stored one or more sets of instructions and data structures (e.g., instructions 524) embodying or utilized by any one or more of the methodologies or functions described herein. The instructions 524 may also reside, completely or at least partially, within the main memory 504 and/or within the processors 502 during execution thereof by the computer system 500. The main memory 504 and the processors 502 may also constitute machine-readable media.

The instructions 524 may further be transmitted or received over a network 526 via the network interface device 520 utilizing any one of a number of well-known transfer protocols (e.g., Hyper Text Transfer Protocol (HTTP)).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for processing data packets using policy-based networks have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for processing a data packet using a policy-based network path, the system comprising:
   a policy enforcing point that:
      receives, from a client, the data packet associated with a service session, the policy enforcing point being associated with a plurality of network application appliances configured to process data packets;
      determines data packet information associated with the data packet;
      based on the data packet information and one or more packet processing criteria, selects the policy-based network path for the data packet from a database storing the one or more packet processing criteria and a plurality of policy-based network paths, the policy-based network path including an order list of the plurality of network application appliances associated with a plurality of policy enforcing points;

based on the order list of the plurality of network application appliances, sends the data packet to a first network application appliance of the order list of the plurality of network application appliances, the first network application appliance being associated with the policy enforcing point;

receives the data packet back from the first network application appliance upon processing the data packet by the network application appliance;

based on the determination of the policy-based network path, generates a further data packet by encapsulating the data packet and the policy-based network path into the further data packet; and routes the further data packet to a further policy enforcing point of the plurality of policy enforcing points in the policy-based network path, wherein the further policy enforcing point determines the policy-based network path by retrieving the policy-based network path from the further data packet; and the database configured to store the plurality of policy-based network paths.

2. The system of claim 1, wherein the data packet information includes one or more of the following: information associated with content of the data packet, information associated with one or more prior data packets of the session, and further information obtained from a network computer.

3. The system of claim 1, wherein the data packet information includes one or more of the following: a Media Access Control (MAC) address, a network interface number, a source Internet Protocol (IP) address, a destination IP address, a source Transmission Control Protocol (TCP)/User Datagram Protocol (UDP) port, a destination TCP/UDP port, a TCP/UDP option, a Uniform Resource Locator (URL), cookie information, a Domain Name System (DNS) identity, a service session identity, a receiving time of the data packet, an error code, a document file name, and a command string.

4. The system of claim 1, wherein each of the plurality of policy enforcing points is in communication with at least one network application appliance of the plurality of network application appliances, the data packet being routed through the plurality of policy enforcing points according to the order list.

5. The system of claim 1, wherein the policy enforcing point is configured to examine the policy-based network path, select a next policy enforcing point on the policy-based network path, and forward the data packet to the next policy enforcing point.

6. The system of claim 1, wherein the policy enforcing point is further configured to:
send the further data packet to a next policy enforcing point, the further data packet including the data packet and the policy-based network path.

7. The system of claim 6, wherein the policy enforcing point encapsulates the policy-based network path into a protocol header of the further data packet.

8. The system of claim 1, wherein the policy enforcing point further:
establishes a tunneling communication session; and
wherein the further data packet is adopted for the tunneling communication session.

9. A computer-implemented method for processing a data packet using a policy-based network path, the method comprising:
receiving from a client, by a policy enforcing point, the data packet associated with a service session, the policy enforcing point being associated with a plurality of network application appliances configured to process data packets;

determining, by the policy enforcing point, data packet information associated with the data packet;

based on the data packet information and one or more packet processing criteria, selecting, by the policy enforcing point, the policy-based network path for the data packet from a database storing the one or more packet processing criteria and a plurality of policy-based network paths, the policy-based network path including an order list of the plurality of network application appliances associated with a plurality of policy enforcing points;

based on the order list of the plurality of network application appliances, sending, by the policy enforcing point, the data packet to a first network application appliance of the order list of the plurality of network application appliances, the first network application appliance being associated with the policy enforcing point;

receiving, by the policy enforcing point, the data packet back from the first network application appliance upon processing the data packet by the network application appliance;

based on the determination of the policy-based network path, generating a further data packet by encapsulating the data packet and the policy-based network path into the further data packet; and routing, by the policy enforcing point, the further data packet to a further policy enforcing point of the plurality of policy enforcing points in the policy-based network path, wherein the further policy enforcing point determines the policy-based network path by retrieving the policy-based network path from the further data packet.

10. The computer-implemented method of claim 9, wherein the data packet information includes one or more of the following: information associated with content of the data packet, information associated with one or more prior data packet of the session, and further information obtained from a network computer.

11. The computer-implemented method of claim 9, wherein the data packet information includes one or more of the following: a Media Access Control (MAC) address, a network interface number, a source Internet Protocol (IP) address, a destination IP address, a source Transmission Control Protocol (TCP)/User Datagram Protocol (UDP) port, a destination TCP/UDP port, a TCP/UDP option, a Uniform Resource Locator (URL), cookie information, a Domain Name System (DNS) identity, a service session identity, a receiving time of the data packet, an error code, a document file name, and a command string.

12. The computer-implemented method of claim 9, wherein each of the plurality of policy enforcing points is in communication with at least one network application appliance of the plurality of network application appliances, the data packet being routed by the policy enforcing point through the plurality of policy enforcing points according to the order list.

13. The computer-implemented method of claim 9, further comprising:

examining, by the policy enforcing point, the policy-based network path;

selecting, by the policy enforcing point, a next policy enforcing point on the policy-based network path; and forwarding, by the policy enforcing point, the data packet to the next policy enforcing point.

14. The computer-implemented method of claim 9, further comprising:

sending the further data packet to a next policy enforcing point, the further data packet including the data packet and the policy-based network path.

15. The computer-implemented method of claim 9, further comprising encapsulating, by the policy enforcing point, the policy-based network path into a protocol header of the further data packet.

16. The computer-implemented method of claim 9, further comprising:

establishing, by the policy enforcing point, a tunneling communication session; and generating, by the policy enforcing point, a new data packet adapted for the tunneling communication session, the new data packet incorporating the data packet.

17. The computer-implemented method of claim 9, wherein the data packet is sent to a next policy enforcing point in a further communication session.

18. The computer-implemented method of claim 9, further comprising sending, by the policy enforcing point, the policy-based network path to a next policy enforcing point prior to sending the data packet to the next policy enforcing point.

19. A system for processing a data packet using a policy-based network path, the system comprising:

a policy enforcing point that:

receives, from a client, the data packet associated with a service session, the policy enforcing point being associated with a plurality of network application appliances configured to process data packets;

determines data packet information associated with the data packet;

based on the data packet information and one or more packet processing criteria, selects the policy-based network path for the data packet from a database storing the one or more packet processing criteria and a plurality of policy-based network paths, wherein the policy-based network path includes an order list of the plurality of network application appliances associated with a plurality of policy enforcing points, each of the plurality of policy enforcing points being in communication with at least one network application appliance of the plurality of network application appliances;

based on the order list of the plurality of network application appliances, sends the data packet to a first network application appliance of the order list of the plurality of network application appliances, the first network application appliance being associated with the policy enforcing point;

receives the data packet back from the first network application appliance upon processing the data packet by the network application appliance; and based on the determination of the policy-based network path, generates a further data packet by encapsulating the data packet and the policy-based network path into the further data packet; and routes the further data packet to a further policy enforcing point of the plurality of policy enforcing points in the policy-based network path, the further data packet being routed through the plurality of policy enforcing points according to the order list, wherein the further policy enforcing point determines the policy-based network path by retrieving the policy-based network path from the further data packet; and the database configured to store the plurality of policy-based network paths.

* * * * *